United States Patent [19]

Givens et al.

[11] 4,180,730
[45] Dec. 25, 1979

[54] LOGGING TECHNIQUE FOR ASSAYING FOR URANIUM IN EARTH FORMATIONS

[75] Inventors: Wyatt W. Givens; William R. Mills, Jr., both of Dallas, Tex.

[73] Assignee: Mobil Oil Corporation, New York, N.Y.

[21] Appl. No.: 868,948

[22] Filed: Jan. 12, 1978

Related U.S. Application Data

[63] Continuation-in-part of Ser. No. 759,929, Jan. 17, 1977, abandoned.

[51] Int. Cl.² ............................................. G01V 5/00
[52] U.S. Cl. .................................. 250/265; 250/269
[58] Field of Search ............... 250/262, 264, 265, 266, 250/269, 390

[56] References Cited

U.S. PATENT DOCUMENTS

| | | | |
|---|---|---|---|
| 2,920,204 | 1/1960 | Youmans | 250/265 |
| 3,385,969 | 5/1968 | Nelligan | 250/265 |

Primary Examiner—Alfred E. Smith
Assistant Examiner—Janice A. Howell
Attorney, Agent, or Firm—C. A. Huggett; W. D. Jackson; W. J. Scherback

[57] ABSTRACT

A borehole logging tool includes a source of fast neutrons, an epithermal neutron flux detector, and a thermal neutron flux detector. A count rate meter is connected to each detector. A ratio detector provides a signal indicative of the ratio of the count rates of the two detectors obtained during the time that prompt neutrons are emitted from neutron fission of uranium in the formation.

13 Claims, 4 Drawing Figures

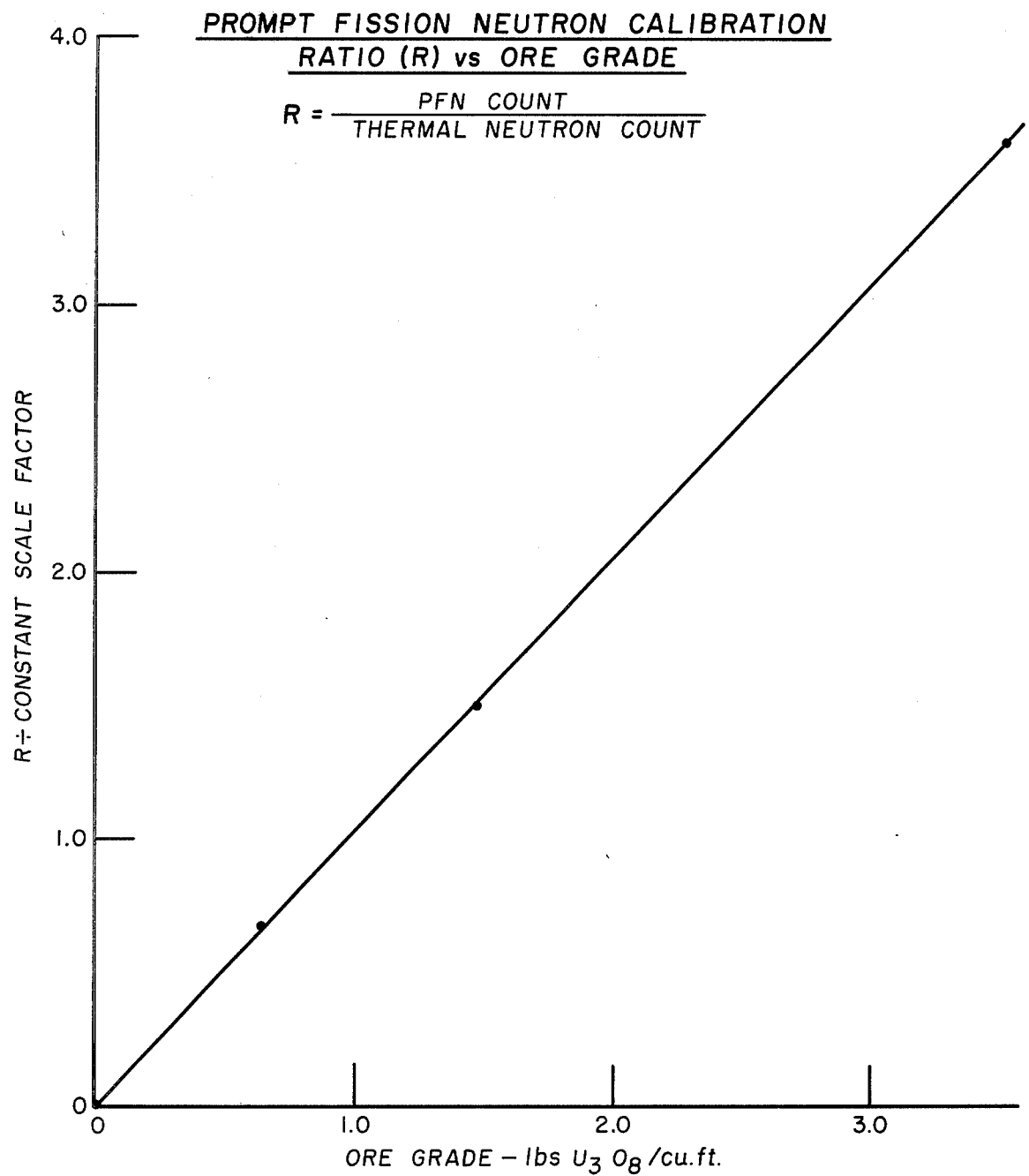

LOGGING TECHNIQUE FOR ASSAYING FOR URANIUM IN EARTH FORMATIONS

CROSS REFERENCES TO RELATED APPLICATIONS

This application is a continuation-in-part of U.S. patent application Ser. No. 759,929 filed Jan. 17, 1977, now abandoned.

BACKGROUND OF THE INVENTION

This invention relates to a radioactive logging technique and more particularly to a prompt fission neutron uranium assaying technique.

When a formation containing a uranium ore is irradiated with fast neutrons, the uranium nuclei react to neutron bombardment by breaking into smaller nuclear fractions which are normally referred to as fission products. The fission of uranium is attended by the emission of prompt neutrons immediately upon occurrence of the fission reaction and also by the emission of delayed neutrons by the fission products subsequent to the fission reaction. The prompt fission neutrons are emitted at the time of the fission reaction, while the delayed neutrons are emitted by the fission products for an appreciable length of time following the fission reaction.

The use of fast neutron irradiation for the detection of uranium has also been explored in a paper by Jan A. Czubek, "Pulsed Neutron Method for Uranium Well Logging," GEOPHYSICS, Vol. 37, No. 1, Feb. 1972, pp. 160–173. Czubek examines several phenomena associated with fast neutron irradiation of uranium-bearing formations and concludes that three can be employed to advantage in uranium detection techniques. Those which Czubek proposes for use as uranium content indicators are (1) epithermal neutron intensity resulting from prompt thermal neutron fission of uranium 235, (2) delayed thermal neutron intensity from prompt thermal neutron fission of uranium 235, and (3) delayed thermal neutron intensity from fast neutron fission of uranium 238. The author also sets forth a number of relationships including Equations 12 and 31 as set forth below:

$$R_f(t_1, \Delta t, t_T) = N \int_{t_1}^{t_2} R_f(t) dt \quad (12)$$

$$= Q \frac{t_T}{\Delta T} \Sigma_D(v_{Cd}) v_{Cd} \frac{t_s}{\tau_f} v \tau^2$$

$$\cdot e^{-(t_1/\tau)}(e^{\Delta T/\tau} - 1)(1 - e^{-\Delta T/\tau})$$

$$= p_U \frac{\sigma_f \alpha_1 \rho N_o}{A_{235} 10^4} v Q \frac{t_T}{\Delta T} \Sigma_D(v_{Cd}) \frac{v_{Cd}}{\bar{v}}$$

$$\cdot \frac{t_s}{(\Sigma_a)^2} e^{-t_1/\tau}(e^{\Delta T/\tau} - 1)(1 - e^{-\Delta t/\tau})$$

$$R_T(t_T) = p_U Q \bar{v} \Sigma_D \rho N_o 10^{-4} (\Delta t / T) t_T \quad (31)$$

$$\cdot \left\{ \frac{\sigma_f \alpha_1}{A_{235} \Sigma_a} \sum_{i=1}^{6} \frac{\epsilon_{Di}}{\lambda_i} + \frac{\sigma_{ff} \alpha_2}{A_{235} \Sigma_{fa}} \sum_{i=1}^{6} \frac{\epsilon_{fDi}}{\lambda_i} \right\}$$

wherein, $t_2$ is the end of the measurement period,
$t_1$ is the start of measurement period after the beginning of the neutron burst,
Q is the average neutron output,
$t_T$ is the total measurement time,
$\Delta T$ is the time width of neutron burst,
$\rho$ is bulk density,
$\Sigma_D$ is the macroscopic absorption cross section for neutron detector,
$v_{Cd}$ is the neutron velocity for cadmium cutoff,
$t_s$ is the slowing-down time to cadmium cutoff energy,
$v$ is the number of secondary neutrons per fission,
$\tau$ is the mean lifetime of thermal neutrons in the medium,
$P_U$ is the percent weight content of uranium in the ore,
$\sigma_f$ is the thermal fission cross section of $^{235}U$,
$\alpha_1$ is the percent isotopic abundance of $^{235}U$,
$N_o$ is Avogadro's number,
$A_{235}$ is the atomic mass of $^{235}U$,
$A_{238}$ is the atomic mass of $^{238}U$,
$\bar{v}$ is the thermal neutron velocity,
$\Sigma_a$ is the macroscopic absorption cross section of the medium for thermal neutrons,
$\Delta t$ is $t_2 - t_1$,
T is the time between successive neutron bursts,
$\epsilon_{Di}$ is the number of delayed neutrons per fission for the ith group of delayed neutrons,
$\lambda_i$ is the decay constant for the ith group of delayed fission neutrons,
$\sigma_{ff}$ is the fast fission cross section for $^{238}U$,
$\alpha_2$ is the isotopic abundance of $^{238}U$ (in percent), and
$\Sigma_{fa}$ is the macroscopic absorption cross section for fast neutrons.

Equation 12 establishes the relationship between neutron count and uranium ore grade for epithermal neutron detection and Equation 31 establishes the relationship between neutron count and uranium ore grade for detection of delayed thermal neutrons resulting from fast neutron fission of uranium 238 and thermal neutron fission of uranium 235.

Among the rock parameters presented as independent variables in one or both of these equations are bulk density $\rho$ (Equations 12 and 31), the macroscopic absorption cross section for thermal neutrons $\Sigma_a$ (Equations 12 and 31), and the slowing-down time of neutrons $t_s$ (Equation 12). Czubek on pages 172 and 173 discusses the necessity for making compensatory measurements for bulk density, slowing-down time, and the thermal neutron mean life, also referred to as neutron lifetime $\tau$. He states that the bulk density can be determined by gamma-gamma density logging, the slowing-down time for porosity measurements obtained by conventional neutron logging or by employing the neutron generator, and the mean life (or lifetime) by pulsed neutron logging.

In U.S. Pat. No. 3,686,503 to Givens et al, there is disclosed a borehole logging system for characterizing the uranium content of natural earth formations on the basis of measurements of delayed neutrons resulting from neutron fission of uranium. This patent discloses a subsurface assaying operation which is carried out by locating in a borehole adjacent a formation of interest a logging tool which includes a source of fast neutrons and a thermal neutron detector. The formation is irradiated with repetitive bursts of fast neutrons; and subsequent to each burst and after dissipation of the original source neutrons, delayed neutrons resulting from neutron fission of uranium are detected. The output from the detector is then recorded in order to obtain a log indicative of the uranium content of the formation.

SUMMARY OF THE INVENTION

In accordance with the present invention, there is disclosed a new and improved method and system for logging the formations surrounding a borehole for uranium by detecting and counting prompt fission neutrons resulting from the thermal neutron fission of uranium 235.

More particularly, a formation of interest suspected of containing uranium is cyclically irradiated with bursts of fast neutrons. Both epithermal and thermal neutron fluxes resulting from the irradiation of the formation are measured. These neutron fluxes are measured during that time within each cycle of operation when prompt neutrons resulting from the thermal neutron fission of uranium 235 are expected. These measurements of epithermal and thermal neutron fluxes are compared as an indication of the uranium 235 concentration in the formation. This comparison is carried out by a determination of the ratio of the measured epithermal neutron flux to the measured thermal neutron flux. This ratio is proportional to the uranium 235 concentration, provided the epithermal and thermal neutron flux detectors have the same spacing with respect to the neutron source and further provided that the neutrons detected by these detectors are counted during the same time period. In this aspect, the epithermal and thermal neutron flux detectors are concentrically mounted with respect to each other about an axis parallel to the borehole wall so as to be equally sensitive to the epithermal and thermal neutron flux die-away measurements of the formations surrounding the borehole. The thermal neutron flux detector includes a plurality of detectors concentrically spaced about the epithermal neutron flux detector, each of such plurality of thermal neutron flux detectors having their outputs joined together. Each of the plurality of thermal neutron flux detectors and the epithermal neutron flux detector are of cylindrical form having axes parallel to the borehole wall.

In a futher aspect, the ratio of the measured epithermal to the thermal neutron fluxes is modified by a constant of proportionality represented by the ratio of the epithermal and thermal neutron flux detector efficiencies multiplied by the uranium 235 fission cross section.

BRIEF DESCRIPTION OF THE DRAWINGS

FIG. 4 illustrates an experimentally determined calibration curve of the ratio of delayed epithermal to thermal neutron count rates versus uranium ore grade.

DESCRIPTION OF THE PREFERRED EMBODIMENT

Figure 1:
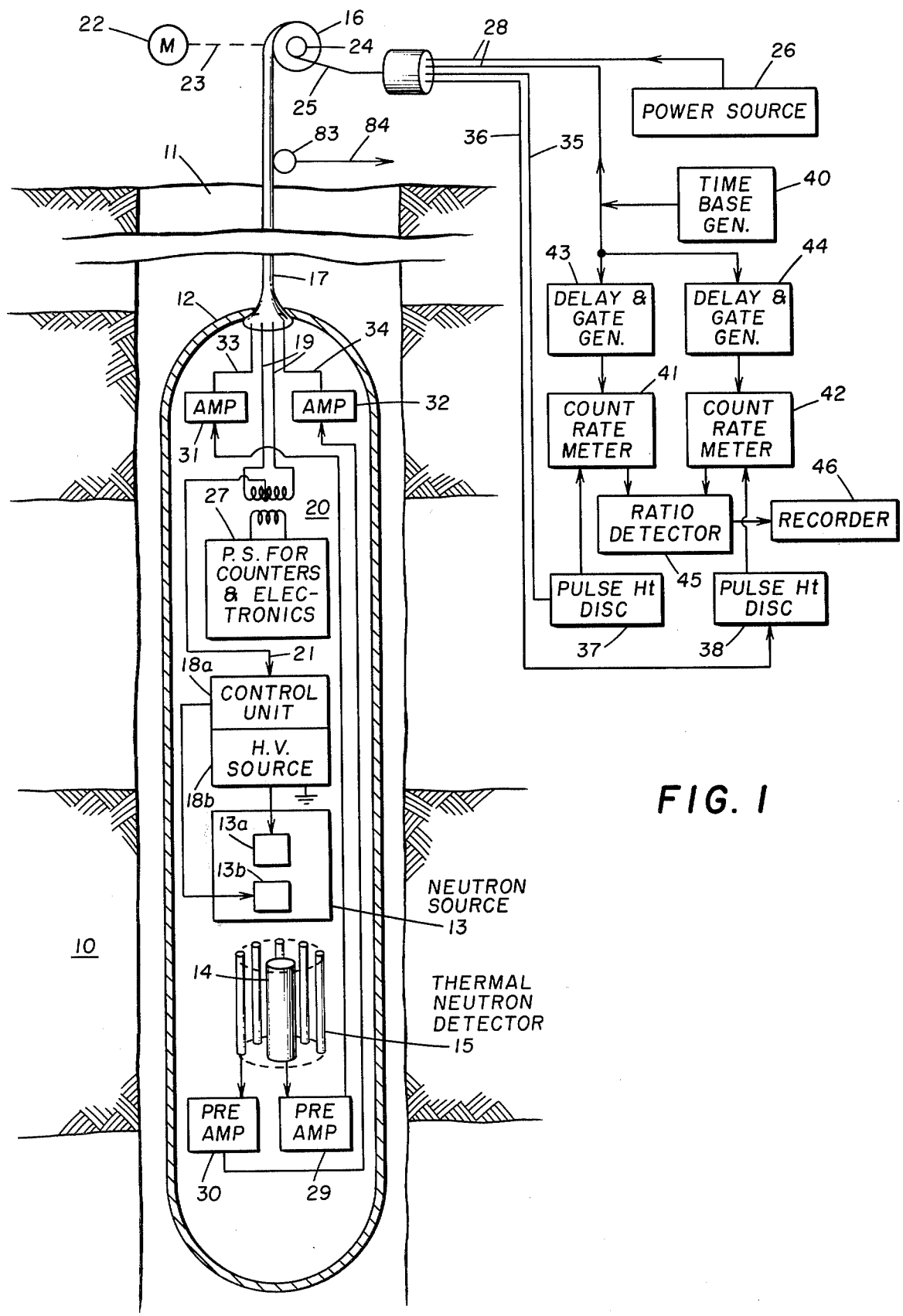
FIG. 1 illustrates a borehole logging system for carrying out the present invention.

Referring to FIG. 1, a formation to be investigated or assayed for uranium content is shown at 10. It is traversed by a borehole 11. Assaying is carried out by lowering an assay tool 12 into the borehole to the level of the formation 10. The assay tool 12 is suspended in the borehole 11 by means of a logging cable 17. In one embodiment, the assay tool includes a neutron source 13 that is preferably an accelerator-type, 14-Mev source which comprises a neutron generator tube. Pulsing of the neutron generator tube is carried out in response to a trigger pulse supplied by the uphole system. The output of the neutron generator tube is a burst of fast neutrons spaced in time for irradiation of the formation 10.

As noted in the aforementioned patent to Givens et al, delayed fission neutrons from the fission reaction of uranium are measured after the original source neutrons have dissipated, which is in the order of a few milliseconds. However, it is a specific aspect of the present invention to measure prompt fission neutrons which are produced within microseconds after the neutron burst from the source of fast neutrons.

Figure 2:
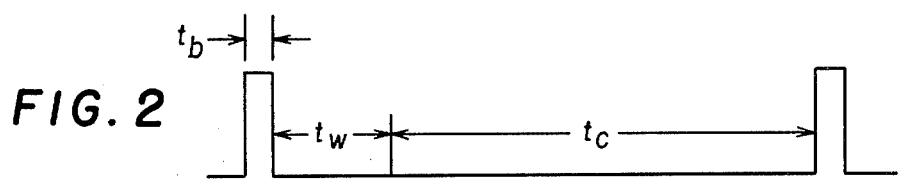
FIG. 2 is a timing diagram representative of the cyclical operation of the borehole logging system of FIG. 1.

To carry out this measurement of prompt fission neutrons within microseconds after each neutron burst, there is provided an epithermal neutron detector 14 and a thermal neutron detector 15. In the preferred embodiment as illustrated in FIG. 2, the source 13 is operated between 304 and 10,000 bursts per second, each burst having a duration of about 5 to 100 microseconds as shown by the period $t_b$. At a preferable burst rate of 1,000 bursts per second, the neutron output of the source 13 will produce in the order of $10^8$ neutrons per second. A waiting period $t_w$ follows each neutron burst to allow the 14-Mev neutrons from the source to die-away to the thermal energy level of about 0.025 ev. A sufficient waiting time period $t_w$ has been found to be about 50 to 100 microseconds. During the remaining time period $t_c$ before the next neutron burst, the number of neutrons detected by the epithermal neutron detector 14 and the thermal neutron detector 15 is counted by the uphole system. The uphole system is gated so as to count the detected neutrons only during the counting period $t_c$ of about 800 to 945 microseconds following each neutron burst. More details of this cyclical activation of the borehole logging tool and the counting of neutrons detected during the $t_c$ counting period of each cycle will now be described.

The logging tool 12 comprises a steel housing supported by the cable 17. This cable is driven from the drum 16 by the motor 22 and the connection 23. Slip rings 24 and brushes 25 are employed to couple the conductors of cable 17 to the uphole recording system for the transmission of signals and voltages. Trigger pulses generated by the time base generator 40 are periodically applied by way of conductors 28, slip rings 24, brushes 25, cable conductors 19, and downhole transformer 20 to actuate the control unit 18 for the production of high-voltage pulses required to cyclically activate the neutron source 13. In the preferred embodiment, this neutron source is an accelerator-type employing a neutron generator tube having a target and an ion source. A neutron source of this type is manufactured by Kaman Nuclear of Colorado Springs, Colorado. The high-voltage supply 18b provides high-voltage D.C., preferably 80 to 150 kilovolts at about 100 microamps, to the target 13a of the neutron source. The control unit 18a, in response to pulses from the time base generator 40, applies high-voltage pulses to the ion source 13b, preferably in the range of 1,000 pulses per second. These pulses are of about 3 kilovolts in amplitude and 5 to 100 microseconds duration. This provides a $10^8$-neutron/second output from the neutron source. A preferable trigger pulse rate is 1,000 pulses per second.

Power for the remaining electronics of the logging tool is supplied by the downhole power source 27. Power to this downhole source is supplied from the uphole power source 26 by way of conductors 28, slip rings 24, brushes 25, cable conductors 19, and downhole transformer 20. For simplicity, connection is not shown between the downhole power source 27 and the other downhole electronics such as the preamplifiers 29 and 30 and the amplifiers 31 and 32.

The neutron detectors 14 and 15 are concentrically mounted (by support structure not shown) with respect to each other about an axis parallel to the borehole wall so as to be equally sensitive to the epithermal and thermal neutron die-away measurements of the formation surrounding the borehole. The epithermal neutron detector 14 preferably is a helium-3 detector in cylindrical form covered with a shield that absorbs thermal neutrons, such as, for example, cadmium. The thermal neutron detector 15 preferably is a plurality of helium-3 detectors concentrically spaced about the epithermal neutron detector 14 with their outputs joined together.

The outputs from neutron detectors 14 and 15 are applied by way of the preamplifiers 29 and 30, amplifiers 31 and 32, cable conductors 33 and 34, uphole conductors 35 and 36, and pulse height discriminators 37 and 38 to the gated count rate meters 41 and 42, respectively. Pulse height discriminator 37 is adjusted to pass to the count rate meter 41 those pulses produced by epithermal neutrons detected by the epithermal neutron detector 14. Pulse height discriminator 38 is adjusted to pass to the count rate meter 42 those pulses produced by thermal neutrons detected by the thermal neutron detector 15. Trigger pulses from the time base generator 40 are applied to delay and gate generators 43 and 44, both of which produce gating pulses for the duration of the desired prompt fission thermal neutron counting period $t_c$, this period preferably beginning about 50 to 100 microseconds after each neutron burst and extending until the beginning of the next neutron burst as illustrated in the example of the preferred embodiment of FIG. 2.

These gating pulses are applied to the count rate meters 41 and 42 for enabling the counting of epithermal and thermal neutrons, respectively, during the preferred counting period $t_c$.

The epithermal neutron count fed to count rate meter 41 during each count period $t_c$ is a measure of the prompt thermal fission neutrons produced by thermal neutron fission of uranium 235 and is represented by the following relationship:

$$\text{Epi. Count} = \epsilon_{epi} N_U \sigma_{fU} g(S, \Sigma_a, t_b, t_w) f(\Sigma_a, t_c) \quad (1)$$

where,
$\epsilon_{epi}$ = efficiency (including geometric factors) of the epithermal neutron detector,
$N_U$ = number of uranium 235 atoms per cubic centimeter,
$\theta_{fU}$ = fission cross section of uranium 235,
$g(S, \Sigma_a, t_b, t_w)$ = thermal neutron flux per cubic centimeter at the end of the wait time $t_w$,
$f(\Sigma_a, t_c)$ = the thermal neutron flux during the count period $t_c$,
S = neutron source strength (neutrons per second),
$\Sigma_a$ = macroscopic absorption cross section, and
$t_b + t_w + t_c \leq T$ = cyclical period.

The term $g(S, \Sigma_a, t_b, t_w)$ representing the thermal neutron flux per unit volume is the source of the fission process of uranium 235. Therefore, anything affecting this thermal neutron flux also affects the epithermal neutron count as a measurement of prompt thermal fission neutrons from uranium 235. From the foregoing, it can be seen that the macroscopic absorption cross section $\Sigma_a$ affects this thermal neutron flux term $g(S, \Sigma_a, t_b, t_w)$. Such macroscopic absorption cross section is represented by the following relationship:

$$\Sigma_a = \Phi \Sigma_f + (1 - \Phi) \Sigma_m \quad (2)$$
$$= N_o \rho \Sigma_i \frac{w_i \sigma_{ai}}{M_i}$$

where,
$\Phi$ = porosity,
$\Sigma_f$ = macroscopic absorption cross section of the formation fluid,
$\Sigma_m$ = macroscopic absorption cross section of the formation matrix,
$N_o$ = Avogadro's number,
$\rho$ = formation bulk density,
$w_i$ = weight fraction of i'th type isotope,
$\sigma_{ai}$ = thermal neutron absorption cross section of i'th type isotope, and
$M_i$ = atomic mass of i'th type isotope.

The summation is taken over all isotope types present in the formation.

It is therefore a specific feature of the present invention to correct the epithermal neutron count for the effects on the thermal neutron flux of bulk density, slowing-down time, and thermal neutron lifetime (directly related to $\Sigma_a$). This correction is carried out by utilizing a ratio detector 45 to divide the epithermal neutron count from count rate meter 41 by the thermal neutron count from the count rate meter 42. The thermal neutron count fed to count rate meter 42 during each count period $t_c$ is represented by the following relationship:

$$\text{Ther. Count} = \epsilon_{ther} g(S, \Sigma_a, t_b, t_w) f(\Sigma_a, t_c) \quad (3)$$

where $\epsilon_{ther}$ = efficiency (including geometric factors) of the epithermal neutron detector.

Figure 3:
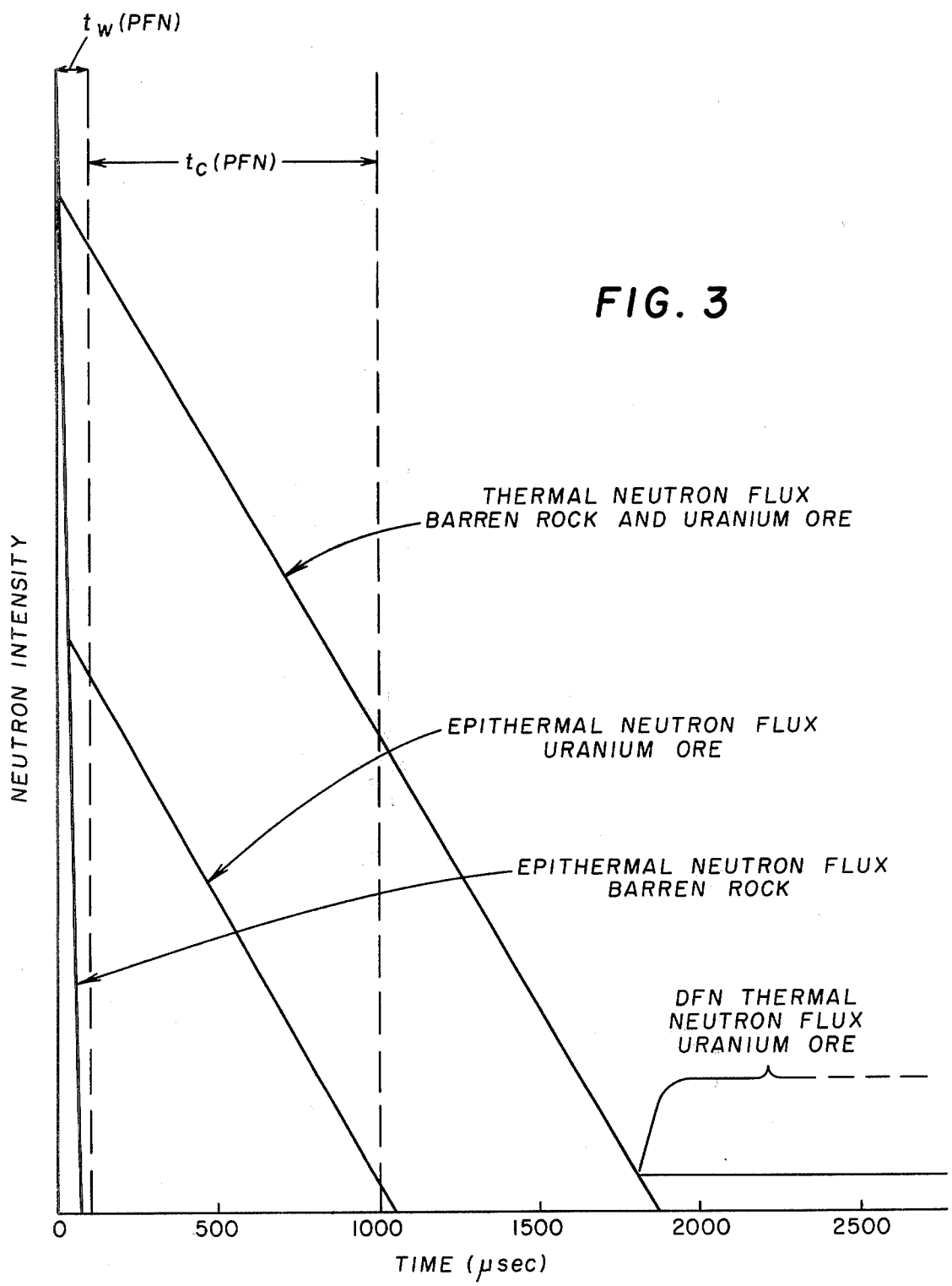
FIG. 3 illustrates, in graphical form, characteristics of example subsurface formations as might be encountered when logging with the borehole logging system of FIG. 1.

FIG. 3 illustrates the epithermal and thermal neutron fluxes as a function of time for a uranium ore-bearing formation and a barren formation, where both the ore-bearing and barren formations have the same macroscopic absorption cross section. The die-away rates measured by the epithermal and thermal neutron detector systems will be the same, provided the detector systems are properly located with respect to the neutron source. For this condition, i.e., both detector systems measuring the same die-away rate, the division of the epithermal neutron count or count rate by the thermal neutron count or count rate is represented by the following relationship:

$$C_{epi}/C_{ther} = \epsilon_{epi} \sigma_{fU} N_U / \epsilon_{ther} \quad (4)$$

where $\epsilon_{epi} \sigma_{fU} / \epsilon_{ther}$ is a constant term K, provided both the thermal and epithermal neutron detector systems measure the same die-away rate and further provided that the thermal and epithermal neutron count rate meters are gated to count neutrons during the same counting period $t_c$. It can be seen that the ratio is zero for a barren formation and is directly proportional to the uranium concentration in a uranium-bearing formation. Upon further calibrating the ratio detector 45 in accordance with the constant of proportionality K representing the ratio of the epithermal and thermal neutron detector efficiencies times the uranium 235 fission cross section, an output is provided to recorder 46 representative of the uranium 235 concentration in the formation.

Ratio detector 45 may be of a conventional type as disclosed on pages 338 and 339 in ELECTRONIC ANALOG COMPUTERS, Gravino A. Korn and Theresa M. Korn, McGraw-Hill Book Company, Inc., New York, 1956. It will be apparent to those skilled in the art that the ratio detector 45 can be calibrated in terms of the constant K by the proper selection of feedback and biasing resistors to give the uranium concentration in desired units of lbs $U_3O_8/ft^3$, kilograms $U_3O_8/meter^3$, etc. The constant is determined by measuring the ratio of the two detectors' efficiencies over a range of uranium 235 concentrations as illustrated by the experimentally determined calibration curve in FIG. 4.

In the foregoing-described preferred embodiment, detector 15 is a thermal neutron detector utilized for measuring thermal neutron flux that represents predominantly the thermal neutron parameters of the formation being logged. In an alternate embodiment, this same thermal neutron flux measurement may be carried out by the use of a gamma-ray detector that measures the thermal neutron capture gamma rays emitted by the formation. It is therefore to be understood that within the scope of the appended claims, the measurement of thermal neutron flux representing predominantly the thermal neutron parameters of the formation may be carried out by either the detection of thermal neutrons or thermal neutron capture gamma rays.

We claim:

1. A method of assaying for uranium in formations traversed by a borehole, comprising the steps of:
   (a) cyclically irradiating a formation of interest suspected of containing uranium with bursts of fast neutrons,
   (b) measuring the thermal and the epithermal neutron fluxes within each cycle of operation when prompt neutrons resulting from neutron fission of uranium are expected to be detected, and
   (c) comparing the measurements of the thermal and epithermal neutron fluxes as an indication of the concentration of uranium.

2. The method of claim 1 wherein said step of comparing the measurements of the thermal and epithermal neutron fluxes includes the determination of the ratio of the epithermal neutron count to the thermal neutron count.

3. The method of claim 2 further including the step of modifying said ratio by a predetermined constant that is representative of the fission cross section of uranium 235 and the ratio of the counting efficiencies of the epithermal and thermal neutron flux detectors.

4. The method of claim 1 wherein said formation is cyclically irradiated at a rate in excess of 304 neutron bursts per second.

5. The method of claim 1 wherein said formation is cyclically irradiated at a rate in the order of 1,000 neutron bursts per second.

6. The method of claim 1 wherein each of said bursts of fast neutrons continues for a duration in excess of 5 microseconds.

7. The method of claim 1 wherein the measuring of said thermal and epithermal neutron fluxes begins after the fast neutrons have slowed down to a thermal energy level.

8. The method of claim 7 wherein the measuring of said thermal and epithermal neutron fluxes begins at least 50 microseconds after the termination of each cyclical burst of fast neutrons.

9. The method of claim 7 wherein said measuring continues until the next succeeding burst of fast neutrons is cyclically initiated.

10. The method of claim 1 wherein the measuring of epithermal and thermal neutron fluxes includes the counting of epithermal and thermal neutrons.

11. The method of claim 1 wherein the measuring of epithermal and thermal neutron fluxes includes the counting of epithermal neutrons and thermal neutron capture gamma rays.

12. The method of claim 1 wherein said step of comparing the measurements of the thermal and epithermal neutron fluxes includes the determination of the ratio of the epithermal neutron count to the thermal neutron capture gamma ray count.

13. A method of assaying for uranium in formations traversed by a borehole, comprising the steps of:
   (a) cyclically irradiating a formation of interest suspected of containing uranium with bursts of fast neutrons,
   (b) detecting thermal and epithermal neutrons resulting from the irradiation of said formation,
   (c) counting the thermal and epithermal neutrons detected within each cycle of operation when prompt neutrons from neutron fission of uranium are expected to be detected, and
   (d) determining the ratio of the epithermal neutron count to the thermal neutron count as an indication of the concentration of uranium.

* * * * *